United States Patent
Münning et al.

(10) Patent No.: US 12,534,070 B2
(45) Date of Patent: Jan. 27, 2026

(54) METHOD AND EMERGENCY STOPPING DEVICE FOR PERFORMING A SAFE EMERGENCY STOPPING MANEUVER OF A MOVING VEHICLE

(71) Applicant: Volkswagen Aktiengesellschaft, Wolfsburg (DE)

(72) Inventors: Daniel Münning, Braunschweig (DE); Lukas Ackert, Frellstedt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 153 days.

(21) Appl. No.: 18/422,235

(22) Filed: Jan. 25, 2024

(65) Prior Publication Data
US 2025/0018935 A1     Jan. 16, 2025

(30) Foreign Application Priority Data
Jan. 27, 2023   (DE) .................. 10 2023 200 694.4

(51) Int. Cl.
*B60W 30/08* (2012.01)
*B60W 30/18* (2012.01)

(52) U.S. Cl.
CPC ...... *B60W 30/08* (2013.01); *B60W 30/18163* (2013.01); *B60W 2420/403* (2013.01);
(Continued)

(58) Field of Classification Search
CPC ........... B60W 30/08; B60W 30/18163; B60W 2420/403; B60W 2540/21;
(Continued)

(56) References Cited

U.S. PATENT DOCUMENTS

2008/0027607 A1   1/2008  Ertl et al. ...................... 701/36
2017/0297565 A1  10/2017  Joyce et al.
(Continued)

FOREIGN PATENT DOCUMENTS

DE   102012001312 A1   8/2012  ............ B60W 10/18
DE   102016214916 A1   2/2018  ............ B60K 35/00
(Continued)

OTHER PUBLICATIONS

Munning Daniel et al., Jul. 1, 2021 English Machine Translation_DE10 2021206932 A1 provided by Patent Translate by EPO and Google (Year: 2021).*
(Continued)

*Primary Examiner* — Ashley L Redhead, Jr.
(74) *Attorney, Agent, or Firm* — Slayden Grubert Beard PLLC (57) ABSTRACT

A method for performing a safe emergency stopping maneuver is provided. The method comprises: detecting driver status data; initializing an emergency stop assistance system, wherein the emergency stop assistance system determines a stopping position for the emergency stop of the vehicle and at least one planned emergency stopping maneuver; detecting environment data, wherein the environment data is characteristic of an environment of the vehicle; evaluating the environment data and generating a system release variable to release the planned emergency stopping maneuver; depending on the generated system release variable, triggering a request for release of the planned emergency stopping maneuver by another passenger of the vehicle and detecting a special release variable depending on input by the other passenger; performing an adapted emergency stopping maneuver on the basis of the system release variable, the special release variable and the planned emergency stopping maneuver.

20 Claims, 1 Drawing Sheet

(52) U.S. Cl.
CPC ..... *B60W 2540/21* (2020.02); *B60W 2552/10* (2020.02); *B60W 2554/406* (2020.02)

(58) Field of Classification Search
CPC ....... B60W 2552/10; B60W 2554/406; B60W 2420/408; B60W 2540/01; B60W 2540/215; B60W 2552/05; B60W 50/14; B60W 2540/26; B60W 2554/4048; B60K 28/06; B60Y 2302/05
See application file for complete search history.

(56) References Cited

U.S. PATENT DOCUMENTS

| | | | | |
|---|---|---|---|---|
| 2018/0111628 | A1* | 4/2018 | Tamagaki | B60W 50/12 |
| 2019/0106122 | A1 | 4/2019 | Oba | |
| 2019/0118831 | A1 | 4/2019 | Mimura et al. | |
| 2021/0269039 | A1 | 9/2021 | Kagerer et al. | |
| 2021/0276569 | A1 | 9/2021 | Yoshida et al. | |
| 2021/0323568 | A1* | 10/2021 | Kaino | B60W 50/14 |
| 2022/0337696 | A1* | 10/2022 | Abutabl | H04M 1/72421 |
| 2022/0363253 | A1* | 11/2022 | Keshipeddy | A61B 5/117 |
| 2023/0147939 | A1* | 5/2023 | Zeng | G06F 16/2365 707/690 |
| 2024/0400077 | A1* | 12/2024 | Kondasani | A61B 5/18 |

FOREIGN PATENT DOCUMENTS

| | | | |
|---|---|---|---|
| DE | 102018210410 A1 | 1/2020 | ............ B60W 30/08 |
| DE | 102019213560 A1 | 3/2021 | ............ B60W 50/08 |
| DE | 102021206932 A1 * | 1/2023 | ............ B60W 50/10 |
| JP | 201157134 A1 | 3/2011 | ............... B60T 7/14 |
| KR | 102035341 B1 | 10/2019 | ............ B60W 10/18 |

OTHER PUBLICATIONS

German Office Action, Application No. 102023200694.4, 8 pages, Aug. 14, 2023.

* cited by examiner

METHOD AND EMERGENCY STOPPING DEVICE FOR PERFORMING A SAFE EMERGENCY STOPPING MANEUVER OF A MOVING VEHICLE

CROSS-REFERENCE TO RELATED APPLICATIONS

This application claims priority to German Patent Application No. DE 10 2023 200 694.4, filed on Jan. 27, 2023 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The present disclosure relates to a method and a system for executing an emergency stopping maneuver in an emergency with the participation of a passenger.

To increase the road safety of motor vehicles, systems termed emergency stop assistance systems or emergency stop assistants may be used which make it possible to recognize unfitness of the driver to drive a motor vehicle by means of a suitable driver monitoring system and, if unfitness to drive exists, to automatically bring the vehicle to a standstill in a safe manner without endangering the surrounding traffic. For example, in this regard, during a trip on a highway, the vehicle should be moved to the hard shoulder.

Driving unfitness can, for example, be a medically related loss of control of the vehicle by the vehicle driver which makes automatically bringing the vehicle to a standstill necessary. Causes of this can for example be a heart attack, stroke, insulin shock, sneezing attack, epileptic fit, fainting, etc.

After the driver's unfitness has been determined, a system may monitor the vehicle's environment. Only if the vehicle's environment allows a lane change is an internal release granted and a lane change enabled. Rear radars monitor the vehicle's environment, for example to detect in a timely manner vehicles approaching quickly from the rear with which the ego vehicle could collide during a triggered lane change. It should be noted that the environment sensors of the vehicle are subject to system limits.

For example, the case may arise that a lane change/hard shoulder change could be performed safely by the function, but a release is not granted since, for example, the front view of the sensor system is limited due to external circumstances; to refer to an example, a scenario in which there is slow traffic. In this case, the front view of the markings by the front camera can be greatly restricted by objects in front driving very closely ahead. The marking of the neighboring lane is also very relevant for a lane change. The front camera is generally mounted in the middle in the vehicle close to the interior mirror. Depending on the opening angle of the camera, there is therefore significant blocking of the neighboring lanes, particularly if a large vehicle or truck is driving ahead.

SUMMARY

A need exists to provide a method and a system which enable greater usefulness of an emergency assistance system.

The need is addressed by the subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method according to some embodiments for performing a safe emergency stopping maneuver of a moving vehicle, driver status data with regard to the driving fitness of a driver of the vehicle is detected by at least one driver monitoring apparatus. In this context, driving unfitness may be understood to mean any situation in which the driver is not (or no longer) able to properly steer the vehicle. Such driving unfitness exists, for example, in the event of a heart attack, a stroke, an insulin shock, an epileptic fit, fainting by the driver, or the like. In some embodiments, the driving fitness of the driver is recorded by a driver monitoring apparatus, also referred as 'driver monitoring sensor' herein.

For example, in this regard, driver status data is detected and evaluated. The at least one driver monitoring apparatus comprises for example a camera arranged in the interior of the vehicle for monitoring the driver, a pulse sensor, an apparatus for monitoring the steering activity of the driver or the like.

In some embodiments, an assistance system monitors the steering activity of the driver, for example a lane departure warning system or line assist. In this regard, it would be conceivable in some embodiments for a first time period to be specified, or respectively specifiable during which no steering activity by the driver is detected without a reaction by the system. For example, the system can ask the driver to assume steering after the first time period without steering activity has been exceeded, for example by visual, acoustic and/or haptic stimuli. For example, a second time period can be specified within which waiting for a reaction by the driver occurs, in particular a reaction by the driver as a reaction to the request by the system, for example that the driver resumes steering, or that he confirms his fitness to drive, e.g., via the HMI or by voice input.

If the driver does not react to the request to assume steering or confirm his fitness to drive within this second time period, the driver monitoring apparatus can establish the driving unfitness of the driver.

Alternatively or additionally and in some embodiments, it is conceivable in this regard that a driver camera, that is, a camera which is arranged inside the passenger compartment and serves to monitor the driver, monitors the eyes of the driver or a facial movement by the driver. It would also be conceivable in some embodiments that a pulse and/or blood pressure of the driver can be monitored by a driver monitoring apparatus. To this end, sensors could be arranged, for example, in the steering wheel and/or driver's seat. If, for example, it is detected that the driver is starting to fall asleep or has already fallen asleep, the driver monitoring apparatus can try to wake up the driver, for example using acoustic and/or haptic stimuli (e.g., a vibration of the driver's seat or the steering wheel).

On the basis of the detected driver status data, the driver monitoring apparatus can in some embodiments determine driving unfitness by the driver and the necessity of an emergency stop of the vehicle.

In another step and in some embodiments, an emergency stop assistance system is initialized on the basis of the detected driver status data, wherein the emergency stop assistance system determines a stopping position for the emergency stop of the vehicle and at least one planned emergency stopping maneuver. In some embodiments, proceeding from the current position of the vehicle, in particular together with data from a navigation system, a stopping position is determined.

For example, the determined stopping position is such a position at which a minimum danger, or respectively risk of danger exists for the ego vehicle as well as for the surrounding traffic. If the vehicle is moving, for example, on a highway, a stopping position on the hard shoulder is may for example be determined.

In some embodiments, the initialization of the emergency stop assistance system comprises the determination of a planned emergency stopping maneuver. In this context, a planned emergency stopping maneuver is understood to be an automatic driving maneuver to move the vehicle from its current position and speed to a standstill at the determined stopping position. It is conceivable in this regard that known obstacles or components of the road infrastructure (e.g., permanent construction site, barriers, breakdown bay, etc.) are taken into account in the determination of the planned emergency stopping maneuver.

For example, the initialization of the emergency stop assistance system includes a warning to other road users and/or the environment of the vehicle. It is conceivable in this regard in some embodiments for other road users to be warned by flashing warning lights and/or honking.

In some embodiments, after the initialization and for example during the execution of the entire method, there is an attempt to bring the driver back after driving unfitness has been determined. For example in doing so, there is an attempt to "wake up" the driver using visual and/or acoustic and/or haptic stimuli, or respectively to steer his attention back to driving the vehicle.

In another step and in some embodiments, environment data is detected with at least one environment detection apparatus, wherein the environment data is characteristic of an environment of the vehicle. The terms 'environment detection apparatus' and 'environment detector' are used interchangeably herein. For example, the at least one environment detection apparatus comprises a front camera of the vehicle, and/or a rear (view) camera, and/or a radar sensor, and/or a lidar sensor, and/or an ultrasonic sensor or the like. In some embodiments, the at least one environment detection apparatus is suitable and intended for detecting and/or capturing the presence of objects, and/or vehicles, and/or obstacles in the environment of the vehicle.

It is possible in this regard in some embodiments for both the own lane of the ego vehicle, as well as neighboring lanes, as well as the edge region of the road, or respectively a hard shoulder to be detected. For example, the presence of other vehicles and their (relative) speed can be inferred from the detected environment data. In some embodiments, the environment data is characteristic of a traffic volume in the environment of the vehicle and/or of an infrastructure in the environment of the vehicle. In some embodiments, the at least one environment detection apparatus comprises a rear radar sensor which is for example configured to detect a vehicle coming from behind and/or to ascertain its (relative) speed.

In some embodiments, the environment data is detected by more than one environment detection apparatus, and for example, the environment data of the individual environment detection apparatuses is used to check, or respectively confirm the environment data of the other environment detection apparatuses. In this way, for example, a distance to another vehicle which was detected by a front camera could be determined more precisely by an ultrasonic sensor. For example, this results in a redundant determination of the conditions in the environment of the vehicle.

In another step in some embodiments, the environment data is evaluated, and a system release variable is generated to release the planned emergency stopping maneuver. For example, the detected environment data is evaluated depending on the determined stopping position, or respectively the planned emergency stopping maneuver. For example, the environment data is evaluated to find out whether an automatic transposition of the vehicle from the current position to the determined stopping position is safely possible according to the planned emergency stopping maneuver. In some embodiments, a system release variable is generated on the basis of the detected environment data, and/or the determined stopping position, and/or the planned emergency stopping maneuver. The system release variable is for example a variable that is characteristic of the safety, or respectively hazard potential of an emergency stopping maneuver that is planned and/or to be executed, and/or a determined stopping position.

In some embodiments, a planned emergency stopping maneuver can be rated as safe. For example, in such a case, the target lane is free, no fast vehicle is approaching from behind, and no other vehicles and/or other obstacles have been detected that would hinder, or respectively endanger the automatic execution of the planned emergency stopping maneuver. In this case, the method can in some embodiments be ended in that the vehicle is automatically moved to the determined stopping position accordance to the planned emergency stopping maneuver.

In some embodiments, a planned emergency stopping maneuver can be rated as unsafe. For example, the target lane is not free, and/or a fast vehicle is approaching from behind which would collide with the ego vehicle in the case of a lane change, or a lane change is not safely possible for another reason. In this case, the method can be ended in some embodiments in that the vehicle remains in the current lane and automatically brakes to a standstill. In this case, the emergency stopping maneuver that is to be executed, or respectively has been executed, differs from the (originally) planned emergency stopping maneuver in that there are no lane changes.

In some embodiments, a planned emergency stopping maneuver can be rated as conditionally safe. This includes one conceivable situation in which a lane change would in principle be safely possible (target lane free, no vehicle approaching quickly from behind or the like), but an automatic release of the planned emergency stopping maneuver is impossible. This could, for example, be caused by a restricted view of the front camera, e.g., due to a truck driving in front.

In such a case, the system, or respectively the emergency stop assistant cannot directly release the planned emergency stopping maneuver, and the vehicle cannot be automatically moved to the determined stopping position according to the planned emergency stopping maneuver. Consequently, it is proposed within the scope of the present teachings to perform a plausibility check, or respectively another check of the planned emergency stopping maneuver. In particular, another passenger of the vehicle, for example a front passenger, should be involved in order to increase safety.

In another step and in some embodiments, a request for release of the planned emergency stopping maneuver by another passenger of the vehicle, in particular by a front passenger, is triggered depending on the generated system release variable, and a special release variable is detected depending on input by the other passenger, in particular the front passenger. In some embodiments, in the event that a planned emergency stopping maneuver is rated as conditionally safe (corresponding system release variable), a request is output to the other passenger, in particular the front passenger.

In some embodiments, such a request is made by the HMI of the vehicle. For example, a request is made visually, and/or acoustically, and/or haptically. For example, the other passenger, or respectively front passenger is requested to confirm and/or reject a planned emergency stopping maneuver. In some embodiments, input by the other passenger, or respectively front passenger can be made using an actuation element of the HMI and/or a separate actuating means which is for example arranged spatially separate from the HMI, and/or by voice input. In some embodiments, the other passenger, or respectively front passenger, is asked for input within a specified, or respectively specifiable time period. For example, the front passenger is asked to react to the request with an input within 10 seconds or within one minute.

In some embodiments, an input, in particular by actuating an actuating means, is evaluated as a confirmation of the planned emergency stopping maneuver, or respectively as a rating of the situation as safe by the front passenger. For example, an input which is not made, and may for example not be made within a specified time period, is evaluated as a rejection of the planned emergency stopping maneuver, or respectively as a rating of the situation as unsafe.

In some embodiments, an input is made by a single actuation of an actuating means, for example by repeated actuation of one actuating means or different actuating means, and for example by continuous actuation of an actuating means. It is conceivable in this context that the front passenger must confirm the planned emergency stopping maneuver several times or continuously during the execution thereof to ensure that the situation can still be rated safe, or respectively to maintain the release for executing the emergency stopping maneuver.

In some embodiments, the special release variable is generated by continuously actuating an actuation element, and/or by a single actuation of an additional actuation element, and/or by voice control. For example, the additional actuation element is an actuation element that is arranged at a distance from the HMI in the vehicle. For example, such an actuation element is like an eCall button or a button for actuating the hazard warning lights.

In some embodiments, a special release variable is detected depending on the input of the other passenger, or respectively the front passenger. For example the special release variable (of the front passenger) corresponds to a confirmation of the planned emergency stopping maneuver or a refusal to approve of the planned emergency stopping maneuver.

In another step in some embodiments, an adapted emergency stopping maneuver is performed on the basis of the system release variable, the special release variable, and the planned emergency stopping maneuver. This offers the benefit that an emergency stopping maneuver rated as conditionally safe by the system, or respectively the emergency stop assistant, can still be executed in the planned way or also in a modified way after the release by the front passenger. In this case, the adapted emergency stopping maneuver can differ more or less strongly from the planned emergency stopping maneuver depending on the input of the front passenger and the system release variable.

As already discussed above, in the event that a planned emergency stopping maneuver is rated as safe or unsafe by the system, it may not be necessary to get approval from another passenger, especially the front passenger. Either the emergency stopping maneuver can be executed automatically as planned (with a lane change) or executed automatically adapted to the situation (without a lane change, and stopping in the current lane). It would nonetheless be conceivable, however, that, even in the event of a safe and/or unsafe situation, the release by the front passenger could also be requested, for example to increase the safety, to increase the reliability of the emergency stop assistance system, or to maintain legal regulations which, inter alia, permit such a method in the first place.

In some embodiments, the planned emergency stopping maneuver corresponds to the adapted emergency stopping maneuver. In this case, it is in some embodiments conceivable that the planned and/or emergency maneuver to be released is displayed to the other passenger, or respectively front passenger within the context of their request for the release.

In some embodiments, the planned and/or adapted emergency stopping maneuver includes at least one lane change. For example, the at least one lane change is a lane change between two neighboring lanes, and for example a lane change to a hard shoulder.

In some embodiments, the system release variable and/or the special release variable is characteristic of the at least one lane change and/or a target lane to be driven on. In other words, a system release variable, or respectively special release variable concerns a certain lane change to be executed. In some embodiments, a planned emergency stopping maneuver and/or an adapted emergency stopping maneuver contains at least two lane changes and for example more than two lane changes. It is conceivable in this regard that the system release variable, or respectively the special release variable is only characteristic of one lane change; however, it would also be conceivable that the system release variable, or respectively the special release variable is characteristic of more than one lane change.

In the event that a planned emergency stopping maneuver contains more than one lane change to be executed, the other passenger, or respectively the front passenger can be requested to release same. It is conceivable in this regard that the other passenger, or respectively the front passenger grants a release for all lane changes to be executed, or also only for a first lane change to be executed. For example, after a first lane change has been executed, the other passenger, or respectively front passenger is again requested to release another lane change.

In some embodiments, the system release variable and/or the special release variable is characteristic of a target lane to be driven on. It is conceivable in this regard for the target lane to be evaluated with respect to safety. For example, a target lane could be rated as conditionally safe because gravel, wetness or the like is detected thereon.

In some embodiments, the request to the other occupant of the vehicle, in particular the front passenger, contains additional information. It is conceivable in this regard for information to be output to the other passenger, or respectively the front passenger about why a planned emergency stopping maneuver and/or a planned lane change has been rated by the system as safe, unsafe or conditionally safe. For example, a planned emergency stopping maneuver is rated as conditionally safe because the front view by the front camera is greatly restricted, or the target lane has ruts and/or is wet. This offers the benefit that the front passenger can better assess whether he can release a planned emergency stopping maneuver or should rather refuse it.

In some embodiments, a presence of a front passenger is detected by at least one front passenger detection apparatus. The at least one passenger detection apparatus (also referred to as 'passenger detection sensor' herein) comprises for example an interior camera of the vehicle or a sensor to recognize whether a seat is occupied. In some methods, the presence of the other passenger, or respectively the front passenger is detected before the request to release the planned emergency stopping maneuver.

In some methods, the special release variable can be withdrawn by the front passenger, in particular at any time. This offers the benefit that an emergency stopping maneuver can be canceled, or respectively ended at any time, in particular by the front passenger. This takes into account, for example, the instance in which an obstacle spontaneously appears in a target lane or a very fast vehicle comes from behind which was not yet visible at the point in time of the automatic detection of the environment data. A scenario would also be conceivable in some embodiments where the front passenger detects an obstacle or an impairment on the target lane such as slickness, wetness or the like, but this is not recognized by the environment detection apparatus of the vehicle.

For example, the method can be interrupted and/or ended at any point in time, in particular by the intervention of the other passenger, for example the front passenger. For example, a step of the method, and/or the execution of the emergency stopping maneuver, and/or the granting of the special release can be canceled, or respectively ended by another passenger, in particular by the front passenger. For example, one of the aforementioned steps is canceled by an input by the other passenger, in particular the front passenger. It is conceivable in this regard in some embodiments for the input by the other passenger, in particular the front passenger, to be made using the HMI, and/or a special actuation element, and/or by voice control. For example, the method could be performed by loudly voicing the word "Cancel" or another suitable (code) word, in particular a specifiable word which is understood by the system as a cancel command.

In some embodiments, the adapted emergency stopping maneuver is performed on the basis of additional environment data, wherein the additional environment data is detected by a front camera of the vehicle. For example, the additional environment data is characteristic of a front view of the vehicle. For example, the additional environment data is evaluated and an environment variable is determined which is characteristic of the front view of the front camera of the vehicle. For example, this environment variable is a measure of a detected region of the front camera or a section of the detected region. Such an exemplary environment variable includes a viewing range of the front camera (of, e.g., 10 m) or a visible section so that, for example, only a certain section is visible since the remaining part is covered by a vehicle in front.

For example, a threshold value for the environment variable is specified and/or specifiable. In some embodiments, an adapted emergency stopping maneuver is determined on the basis of this environment variable. It is conceivable in this regard that the adapted emergency stopping maneuver is determined differently in the event that the environment variable falls below or exceeds this threshold value. If, for example, the front camera offers a sufficient view of the target lane, a route can be planned for the lane change procedure on the basis of the detected target lane, and the vehicle can be appropriately brought to a standstill in the target lane.

If the determined environment variable is below the specified threshold value, for example the visibility of the front camera is only 10 m or a major part of the view is blocked (e.g., by another vehicle), a route cannot be planned on the basis of the target lane. In the event that a neighboring lane is visible, it is therefore proposed that its width is determined, and the invisible section in front is predicted extrapolating therefrom, wherein the geometry of the target lane is also predicted.

If it is impossible to determine the width of the neighboring lane, it is proposed as an alternative thereto to assume a standard width of the target lane. In addition, the geometry of the ego lane clothoid can be projected onto the neighboring lane. By using this information, a "standard lane change maneuver" can then be performed even if the visibility of the front camera is strongly limited.

In in some embodiments, an automatic emergency call is made, and for example, data concerning a current position and/or concerning the determined stopping position is transmitted. This offers the benefit that an emergency physician can be notified before or during the execution of the emergency stopping maneuver and, by knowing the planned stopping position, he can reach the driver faster and take care of him.

The method relates in particular to methods for increasing the availability of an emergency stop assistance system through front passenger interaction.

The present teachings also addresses an in particular processor-based emergency stopping device (also referred to as 'emergency stopping circuit' or 'emergency stopping system' herein) for performing a safe emergency stopping maneuver of a moving vehicle, wherein the emergency stopping device is suitable and intended to retrieve driver status data regarding driving fitness of a driver of the vehicle from a driver monitoring apparatus (of the vehicle). In addition, the emergency stopping device is suitable and intended to retrieve environment data from an environment detection apparatus (of the vehicle), wherein the environment data is characteristic of the environment of the vehicle.

The vehicle has an emergency stop assistance system which is suitable and intended to determine a stopping position for the emergency stop of the vehicle, and at least one planned emergency stopping maneuver.

The emergency stopping device has an in particular processor-based evaluation apparatus (also referred to as 'evaluation circuit' herein) for evaluating the environment data and for generating a system release variable for releasing a planned (by the emergency stop assistance system) emergency stopping maneuver.

In addition, the emergency stopping device has an in particular processor-based checking apparatus also referred to as 'checking circuit' or 'verification circuit' herein) which is suitable and intended for triggering a request for the release of the planned emergency stopping maneuver by another passenger of the vehicle, in particular by a front passenger, depending on the generated system release variable, and for detecting a special release variable depending on input by the other passenger, in particular the front passenger.

In addition, in particular a processor-based apparatus/circuit is provided in the vehicle for executing an automatic driving mode and for performing the planned emergency stopping maneuver.

According to the teachings herein, the emergency stopping device is suitable and intended for triggering the performance of an adapted emergency stopping maneuver on the basis of the system release variable, the special release variable, and the planned emergency stopping maneuver (by the apparatus for executing an automatic driving mode and for performing the planned emergency stopping maneuver).

For example, the emergency stopping device is configured, suitable, and/or intended for carrying out the above-described method as well as, individually or in combination with one another, all of the method steps already described above in conjunction with the method. Conversely, the method can be equipped with all of the features described in the context of the emergency stopping device, individually or in combination with one another.

In some embodiments, the checking apparatus is configured to trigger the request to release the planned emergency stopping maneuver via the HMI and/or via a loudspeaker. For example, for performing an adapted emergency stopping maneuver, the apparatus for executing an automatic driving mode is suitable and intended to take into account the system release variable, the special release variable, the planned emergency stopping maneuver and/or, in particular, an environment variable.

In some embodiments, the at least one environment detection apparatus is an environment detection apparatus that is selected from a group comprising a front camera, rear (view) camera, ultrasonic sensor, LIDAR sensor, radar sensor and the like. For example, a memory is provided on which the environment data detected by the at least one environment detection apparatus can be at least partially and/or at least temporarily saved.

In some embodiments, the driver monitoring apparatus comprises a vehicle-internal camera such as a driver camera, a pulse and/or blood pressure sensor, and/or an assistance system for monitoring a steering activity (e.g., lane departure warning system or line assist). In some embodiments, a front passenger detection apparatus is provided for the detection of the presence of a front passenger and/or another passenger, wherein the front passenger detection apparatus is for example a vehicle-internal camera, an apparatus for seat detection or seat belt detection.

The present teachings also addresses a system consisting of the emergency stopping device described above, the environment detection apparatus, the emergency stop assistance system and the apparatus for executing an automatic driving mode and performing the planned emergency stopping maneuver.

According to some embodiments, the emergency stopping device is suitable and intended for triggering the performance of an adapted emergency stopping maneuver on the basis of the system release variable, the special release variable, and the planned emergency stopping maneuver (by the apparatus for executing an automatic driving mode and for performing the planned emergency stopping maneuver). The system is suitable and intended to perform the adapted emergency stopping maneuver after the triggering.

The present teachings also address a vehicle, in particular a motor vehicle, comprising an above-described emergency stopping device and/or the above system corresponding to one embodiment. For example, the emergency stopping device is a (fixed, in particular a non-destructively detachable) component of the vehicle.

In particular, the vehicle can be a (motorized) road vehicle. Moreover, in addition to a road vehicle, the vehicle may also be an air taxi, an airplane and another means of locomotion or another type of vehicle, for example an aircraft, watercraft, or rail vehicle.

The present teachings also addresses an external server, in particular a (for example above-described) backend.

The present teachings also address a computer program or computer program product, comprising programming means, in particular a program code which represents or codes at least some or a plurality of the method steps of the method according to the teachings herein individually or in combination with one another and also one of the described embodiments and is designed for execution by means of a processor apparatus.

The present teachings also address a nonvolatile memory, in particular a data memory (storage medium) on which at least one embodiment of the computer program according to the teachings herein or a specific embodiment of the computer program is saved.

In the context of this discussion, the terms 'processor', 'device', 'apparatus', and 'circuit' are understood broadly to comprise hardware and hardware/software combinations to provide the respectively discussed functionality. The respective processor, device, apparatus, and/or circuit may be formed integrally with each other and/or with further components. For instance, the functionality of the processor, device, apparatus, and/or circuit may be provided by a microprocessor, microcontroller, FPGA, or the like, with corresponding programming. The programming may be provided as software or firmware, stored in a memory, or may be provided by dedicated ('hard-wired') circuitry.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
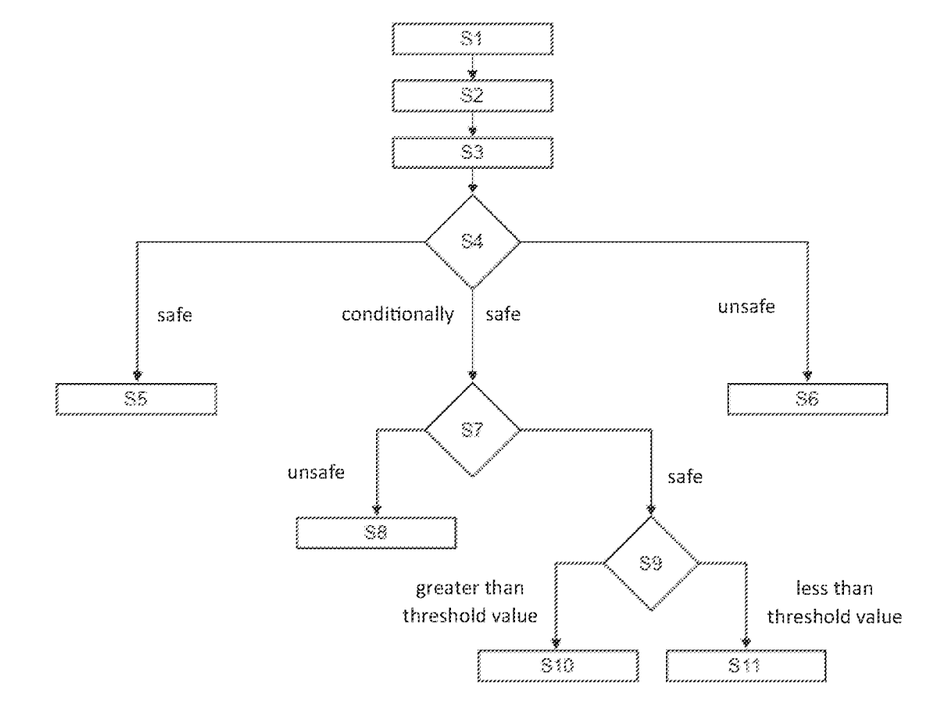
The single FIGURE shows a flow chart of a method according to an embodiment.

In a method step S1, driver status data regarding driving fitness of a driver of the vehicle is detected by a driver monitoring apparatus. It can be determined in this regard whether driving unfitness of the driver exists, for example if there is no driver activity or there is a medical emergency. This can occur, for example, when the vehicle is driven by an assistance system and there is no feedback from the driver for a longer time (e.g. no steering activity). In addition, an evaluation can be performed by a driver observation camera, and sleep or a medical emergency can be detected, or by an actuation of the emergency button by the front passenger.

After the detection of one of the cases mentioned in the above paragraph, the emergency stop assistance system is automatically initialized (method step S2). The system has a goal of establishing a safe state and bringing the vehicle to a standstill at a safe location. In doing so, energy is primarily taken from the system by braking the vehicle. Attempts are still initiated to bring the driver back. There are various warning channels for this. The warnings are visual, acoustic and haptic (braking belts, belt jerks).

Moreover, the surrounding traffic is warned by flashing warning lights and honking. Another goal is to drive to a safe parking spot for the vehicle. On a highway, this means leaving the lanes and switching to the hard shoulder. For example in doing so, a trajectory of the vehicle for reaching the determined stopping position is determined from predictive route information of the navigation system.

In another method step S3, the system checks the vehicle's environment. On the one hand, the surrounding traffic volume is assessed and on the other hand, the surrounding infrastructure. In so doing, environment data is detected with regard to the vehicle's environment; for example, pictures are taken by a front camera or a rear view camera. A rear radar can also be used which checks whether a fast vehicle is approaching from the rear with which the ego vehicle would collide in the event of a lane change.

Since the system works independently at this point and is not monitored by the driver since the driver is out of action, it may be very important to safeguard the environment in order to not endanger other persons or vehicles. In another method step S4, the system evaluates the detected environment data. In doing, various results are possible here, beginning with a situation in which a lane change is safely/easily possible up to instances in which the environment data excludes a lane change. Likewise, situations between the two borderline cases are conceivable.

If the case is identified that an automatic lane change is safely possible since, for example, there are no other vehicles or objects in the lane to be approached (evaluation of the data from the front and/or rear camera) and a measurement from a rear radar apparatus shows no approaching vehicles, all conditions are rated as safe by the system, and the corresponding flag, Change_release_system, is set to the value 1 (safe). In this case, the method is continued with step S5, and the vehicle is automatically moved to the provided stopping position as is known, for example, from the prior art.

If an unsafe situation is recognized, for example when the lane to which a change is supposed to be made is completely full, there is no gap for a lane change, or a vehicle coming quickly from the rear is recognized which would collide with the ego vehicle in the event of a lane change, the corresponding flag, Change_release_system, is set to the value 0 (unsafe). In this case, the method is continued with step S6, and the vehicle is braked in the current lane and brought to a stop without a lane change being performed.

Intermediate cases are also possible between these two borderline cases (safe and unsafe situation). If the system recognizes, for example, that the lane to which a change is supposed to be made is free in the region next to and behind the vehicle, and moreover no vehicle is approaching from the rear, a lane change is in principle safely possible. In this case, it can however happen that the field of view of the front camera is too restricted (for example by a truck driving close in front) or relevant lane markings of the lane to be driven on cannot be sufficiently recognized. In this case, there is a conditionally safe situation, and the flag, Change_release_system, is set to the value 2 (conditionally safe). In such a case, the system cannot independently instigate a lane change or hard shoulder change.

If a front passenger is sitting in the vehicle, the method can be continued with step S7, and a special release can be granted by the front passenger. Accordingly, partial responsibility is passed on to the front passenger. He must ensure that the new target lane, or respectively the target hard shoulder is safe for a change. In method step S7, the system requests a release from the front passenger, for example by a display in the HMI or by a loudspeaker. The front passenger can grant or also refuse such a special release, for example by actuating a corresponding actuation element of the HMI. However, another prerequisite is that the system initially detects the presence of a front passenger, for example by seat detection/recognition, seat belt detection/recognition, or an interior camera.

If the front passenger now believes that the situation is unsafe, since for example there is an object such as another vehicle located in the blocked region (invisible to the front camera) and a potentially hazardous situation could eventuate in the event of a lane change, the front passenger can refuse the release, for example by actuating a corresponding reject actuation element, or by not reacting to the release request by the system. In this case, the flag, Special_release_lane_change_front passenger, is set to a value of 0, or respectively false, and the method continues with step S8.

The method step S8 basically corresponds to the method step S6 in which the vehicle is stopped in the current lane without a lane change being performed.

If contrastingly the front passenger believes that the situation is safe, he can grant a special release to perform the lane change. In this case, the front passenger must continuously monitor the environment and confirm the safe changing option by continuously actuating an actuation element in the HMI, whereby the flag, Special_release_lane_change_front_passenger, is set to a value of 1, or respectively true. Alternatively or in addition to continuously actuating the actuation element, the front passenger can actuate a special button a single time. Such a button can, for example, be arranged in a special place in the vehicle (similar to the button for the hazard warning lights) and be similar to the design of the "eCall" button. A confirmation via voice control or repeated actuation using the HMI would likewise be possible. In addition, the release can be interrupted at any time, e.g. by an "emergency off button", by ceasing to continuously actuate the actuation element, or by a voice input, whereby the flag, Special_release_lane_change_front_passenger, is set to 0, or respectively false.

If the front passenger grants the special release, the method can accordingly be continued with step S9, and an automatic lane change can be performed. The manner in which this is performed is dependent on the front view of the front camera. If the front view of the front camera is less than a specified threshold value, the method is continued with step S10; if the front view of the front camera is greater than a specified threshold value, the method is accordingly continued with step S11.

If the camera has a sufficient visibility (front view greater than the threshold value), route planning for the change process can be performed, and the vehicle can be appropriately parked in the target lane according to method step S10.

If the front view of the front camera is less than a specified threshold value, i.e. if for example, a major portion of the field of view of the front camera is blocked (e.g. by a truck) or if the visibility is only 10 meters, the method continues with step S11. In this case, proper route planning is impossible. If the neighboring lane is visible, its width is determined and predicted for the invisible section in front. Lane geometry is also predicted. If it is impossible to determine the width of the neighboring lane, a standard width is assumed. Moreover, the geometry of the ego lane clothoid can be projected onto the neighboring lane. By using this information, a "standard lane change maneuver" can be performed even when the visibility of the camera is greatly restricted.

A canceling of the change maneuver in all method steps is possible at any time if an object is detected in the change region.

LIST OF REFERENCE NUMERALS

S1 Detection of driver status data
S2 Initialization of emergency stop assistance system
S3 Detection of environment data
S4 Evaluation of environment data
S5 Automatic emergency stopping maneuver with lane change
S6 Automatic emergency stop on existing lane
S7 Triggering of release request
S8 Automatic emergency stop on existing lane
S9 Evaluation of additional environment data with reference to threshold value
S10 Automatic emergency stopping maneuver with lane change
S11 Automatic emergency stopping maneuver with lane change The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for performing a safe emergency stopping maneuver of a moving vehicle comprising:
    detecting driver status data regarding driving fitness of a driver of the vehicle;
    initializing an emergency stop assistance system on the basis of the detected driver status data, wherein the emergency stop assistance system determines a stopping position for the emergency stop of the vehicle and at least one planned emergency stopping maneuver;
    detecting environment data, wherein the environment data is characteristic of an environment of the vehicle;
    evaluating the environment data and generating a system release variable to release the planned emergency stopping maneuver, wherein the system release variable is a variable that is characteristic of the hazard potential of a planned emergency stopping maneuver, which is classified as safe, unsafe, or conditionally safe, and/or is characteristic of a determined stopping position;
    depending on the generated system release variable and in case the planned emergency stopping maneuver is classified as safe, selectively triggering a request for release of the planned emergency stopping maneuver by a front seat passenger, and detecting a special release variable depending on an input by the front seat passenger; and
    performing an adapted emergency stopping maneuver on the basis of the system release variable, the special release variable, and the planned emergency stopping maneuver, wherein the adapted emergency stopping maneuver may differ from the planned emergency stop maneuver depending on the input of the front seat passenger and the system release variable.

2. The method of claim 1, wherein the environment data is characteristic of a traffic volume in the environment of the vehicle and/or of an infrastructure in the environment of the vehicle.

3. The method of claim 2, wherein the planned and/or adapted emergency stopping maneuver includes at least one lane change.

4. The method of claim 2, wherein the system release variable and/or the special release variable is characteristic of the at least one lane change and/or a target lane to be driven on.

5. The method of claim 2, wherein a presence of the front passenger is detected by at least one front passenger detection apparatus.

6. The method of claim 2, wherein the special release variable is generated by continuously actuating an actuation element, and/or by a single actuation of an additional actuation element, and/or by voice control.

7. The method of claim 1, wherein the planned and/or adapted emergency stopping maneuver includes at least one lane change.

8. The method of claim 7, wherein the system release variable and/or the special release variable is characteristic of the at least one lane change and/or a target lane to be driven on.

9. The method of claim 7, wherein a presence of the front passenger is detected by at least one front passenger detection apparatus.

10. The method of claim 7, wherein the special release variable is generated by continuously actuating an actuation element, and/or by a single actuation of an additional actuation element, and/or by voice control.

11. The method of claim 1, wherein the system release variable and/or the special release variable is characteristic of the at least one lane change and/or a target lane to be driven on.

12. The method of claim 11, wherein a presence of the front passenger is detected by at least one front passenger detection apparatus.

13. The method of claim 11, wherein the special release variable is generated by continuously actuating an actuation element, and/or by a single actuation of an additional actuation element, and/or by voice control.

14. The method of claim 1, wherein a presence of the front passenger is detected by at least one front passenger detection circuit.

15. The method of claim 14, wherein the special release variable is generated by continuously actuating an actuation element, and/or by a single actuation of an additional actuation element, and/or by voice control.

16. The method of claim 1, wherein the special release variable is generated by continuously actuating an actuation element, and/or by a single actuation of an additional actuation element, and/or by voice control.

17. The method of claim 1, wherein the special release variable can be withdrawn by the front passenger.

18. The method of claim 1, wherein the adapted emergency stopping maneuver is performed on the basis of additional environment data, wherein the additional environment data is detected by a front camera of the vehicle.

19. An emergency stopping circuit for performing a safe emergency stopping maneuver of a moving vehicle, wherein
the vehicle has an emergency stop assistance system which is suitable and intended to determine a stopping position for an emergency stop of the vehicle and at least one planned emergency stopping maneuver; and wherein
the vehicle has a circuit for executing an automatic driving mode and for performing the planned emergency stopping maneuver, wherein
the emergency stopping circuit is suitable and intended to retrieve driver status data regarding driving fitness of a driver of the vehicle from a driver monitoring sensor, wherein
the emergency stopping circuit is suitable and intended to retrieve environment data from at least one environment detector, wherein
the environment data is characteristic of the environment of the vehicle, having an evaluation circuit for evaluating the environment data and for generating a system release variable for releasing an emergency stopping maneuver planned by the emergency stop assistance system; wherein
the system release variable is a variable that is characteristic of the hazard potential of a planned emergency stopping maneuver, which is classified as safe, unsafe, or conditionally safe, and/or is characteristic of a determined stopping position;
wherein the emergency stopping circuit has a checking circuit which is suitable and intended for triggering a request for the release of the emergency stopping maneuver planned by the emergency stop assistance system by a front seat passenger, depending on the generated system release variable and in case be planned emergency stopping maneuver is classified as safe, and for detecting a special release variable depending on input by the front seat passenger; wherein
the emergency stopping circuit is suitable and intended for triggering a performance of an adapted emergency stopping maneuver on the basis of the system release variable, the special release variable, and the planned emergency stopping maneuver by the circuit for executing an automatic driving mode and for performing the planned emergency stopping maneuver, and wherein the adapted emergency stopping maneuver may differ from the planned emergency stop maneuver depending on the input of the front seat passenger and the system release variable.

20. A vehicle with the emergency stopping circuit of claim 19.

* * * * *